United States Patent Office 3,438,978
Patented Apr. 15, 1969

3,438,978
6-FLUORO STEROIDS
Howard J. Ringold, Albert Bowers, George Rosenkranz, and Octavio Mancera, Mexico City, Mexico, assignors, by mesne assignments, to Syntex Corporation, a corporation of Panama
No Drawing. Filed Aug. 7, 1958, Ser. No. 753,629
Claims priority, application Mexico, Aug. 9, 1957, 48,511
Int. Cl. C07c *169/18, 169/30, 169/34*
U.S. Cl. 260—239.55   79 Claims The present invention relates to cyclopentanophenanthrene compounds and to a process for the preparation thereof.

More particularly the present invention relates to a novel process for the production of 6-fluoro steroids of the androstane and pregnane series by the reaction of a corresponding $5\alpha,6\alpha$-oxido compounds with boron trifluoride. The present invention also relates to certain novel $6\alpha$-fluoro-$\Delta^4$-androsten-$17\beta$-ol-3-one and esters thereof which may have an additional double bond between C–1 and C–2, and to a process producing these compounds; these novel compounds are valuable therapeutic agents and androgenic type hormones having, for example, decreased androgenic activity and increased anabolic activity and/or increased anti-estrogenic activity; $6\alpha$-fluoro-$\Delta^4$-androsten-$17\beta$-ol-3-one with or without an additional double bond between C–1 and C–2 substituted at C–$17\alpha$ by an alkyl, alkenyl or alkynyl hydrocarbon radical of less than 6 carbon atoms, such as, for example, methyl, ethyl, propyl, vinyl, ethinyl or propinyl and esters thereof and to a process for producing these compounds; these novel compounds are valuable therapeutic agents having a high degree of lutinizing activity and a minimal androgenic activity which is an undesirable side effect in progestational agents; $6\alpha$-fluoro-$\Delta^4$-pregnen-3,20-diones and $6\alpha$-fluoro-$\Delta^4$-pregnen-$17\alpha$-ol-3,20-diones with or without an additional double bond between C–1 and C–2 and esters thereof and to a process producing these compounds such as for example the novel $6\alpha$-fluoro-progesterone or $6\alpha$-fluoro-$17\alpha$-acetoxy progesterone which are potent progestational compounds; in addition, some of the intermediates in producing these compounds such as for example the 6-fluoro alkyl enol ethers as for example the 6-fluoro-$17\alpha$-acetoxy progesterone ethyl enol ether are likewise potent progestational compounds and exhibit a prolonged lutinizing action on the end organ; $6\alpha$-fluoro-$\Delta^4$-pregnen-21-ol-3,20-dione with or without a free or esterified $17\alpha$-hydroxy group and esters thereof and to a process producing these compounds; these novel compounds are valuable intermediates and therapeutic agents having progestational activity and no mineral cortoid activity and being further useful in overcoming the mineral corticoid activity of known compounds used for this purpose, such as for example desoxycorticosterone; in addition a double bond may be introduced between C–1 and C–2 by already known methods thereby increasing the said therapeutic value; $6\alpha$-fluoro-$\Delta^4$-$17\alpha,21$-diol-3,11,20-triones and the diesters thereof and to a process producing these compounds; these novel compounds are valuable intermediates in producing $6\alpha$-fluoro-cortical hormones, described in our U.S. application Ser. No. 740,550, filed June 9, 1958, now U.S. Patent No. 2,934,546, an additional double bond may be introduced between C–1 and C–2 thereby increasing the usefulness of these compounds as intermediates; these novel compounds also exhibit an anti-imflammatory and thymolytic activity which makes them useful therapeutic agents.

Although boron trifluoride or boron trifluoride-etherate has been long known in the art as an agent for opening a steroid epoxide ring, there has been no indication that this compound will produce fluoro substituents. Thus boron trifluoride is used in preparing 4-oxygenated steroids by the fission of 4,5-epoxides (U.S. Patent 2,842,571); Heusser et al. teaches the use of boron trifluoride in preparing 11 - keto compounds from $\Delta^{7,9,11}$-oxido steroids (Helv. Chem. Acta. 34, 2106). In our U.S. application Ser. No. 740,550, filed June 9, 1958, now U.S. Patent No. 2,934,546, we described the preparation of $6\alpha$-fluorosteroids by addition of hydrogen fluoride to $5\alpha$-$6\alpha$-oxido cortical hormones. Although boron trifluoride has been suggested as a catalyst in the opening of $5\alpha,6\alpha$-oxido rings with hydrogen fluoride, when used in this way no advantage has been found over the use of hydrogen fluoride alone.

In accordance with the present invention the surprising discovery has been made that when boron trifluoride is reacted with a $5\alpha,6\alpha$-oxido steroid there is produced a stable $5\alpha$-hydroxy $6\beta$-fluoro derivative. In this way the novel $6\alpha$-fluoro and $6\beta$-fluoro-$\Delta^4$-3-keto steroids, more specifically in the androstene or pregnene series may be prepared from the corresponding $5\alpha,6\alpha$-oxido steroids having in the 3-position a keto group or a functionally modified keto group that can be converted into a keto group, such as for example an alkylendioxy substituent or free or esterified alcohol group by treating the $5\alpha,6\alpha$-oxido compounds in an organic solvent with boron trifluoride or boron trifluoride-etherate or similar complex, isolating the $5\alpha$-hydroxy $6\beta$-fluoro compounds, regenerating the 3-keto function and dehydrating the fluorohydrin with or without concurrent inversion of the 6-fluoro atom. The last three steps, namely regeneration of the 3-keto group, dehydration and inversion of the $6\beta$ to $6\alpha$-fluoro compounds may be carried out in one step or separately as described in some detail below.

It will be readily seen that the present invention offers a greater industrial applicability since it does not involve handling of large amounts of highly poisonous agent, prevents the corrosion of industrial equipment and offers a greater ease of material handling since boron trifluoride, especially in the form of its complex, such as for example etherate is a stable chemical compound having a boiling point above 100° C.

The following formula serves to illustrate some of the novel compounds of the present invention:

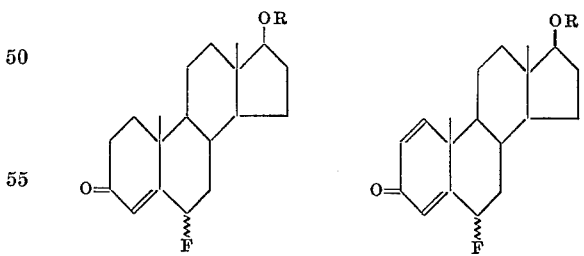

In the above formula the fluorine atom may be either in the alpha or the beta configuration and R refers to the hydrogen atom or to an acyl group derived from hydrocarbon carboxylic acid of up to 12 carbon atoms. This acyl group may be saturated or unsaturated, of straight chain or branched chain aliphatic, cyclic, cycloaliphatic or aromatic and may be conventionally substituted by halogen or methoxy. Typical acyl groups of this type are acetate, propionate, caproate, enanthate, hemisuccinate, cyclopentylpropionate, benzoate, trimethylacetate, phenoxypropionate, and $\beta$-chloropropionate.

3

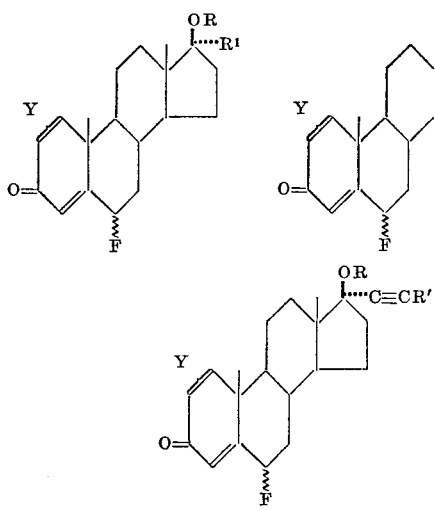

In the above formula the fluorine atom may be either in the alpha or the beta configuration and R refers to the same groups as previously set forth. $R^1$ refers to a lower alkyl group of 6 carbon atoms or less. Typical examples of such a group are for example methyl, ethyl and propyl. Y represents a double bond between C–1 and C–2 or a saturated linkage.

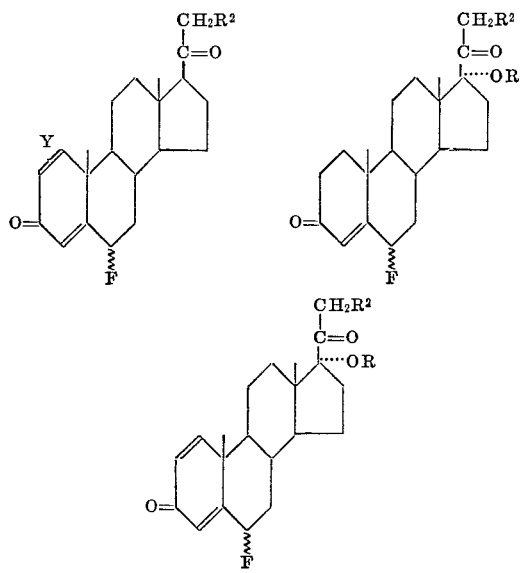

In the above formulas F represents fluorine both in α and β configuration. R and Y represent the same groups as previously set forth and $R^2$ represents hydrogen or fluorine. The compounds represented by the above formulas where Y represents a saturated linkage may be further modified by reacting with lower alkyl orthoformates, such as for example methyl, ethyl, or butyl orthoformates to produce compounds represented by the following formulas.

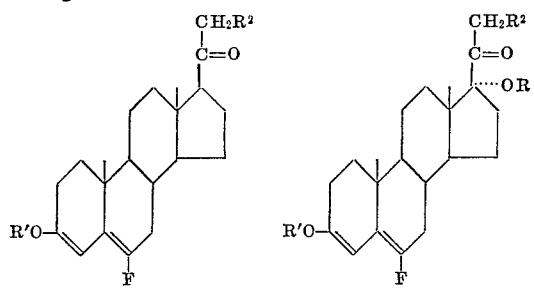

In the above formulas R, $R^1$ and $R^2$ refer to the same groups as previously set forth.

4

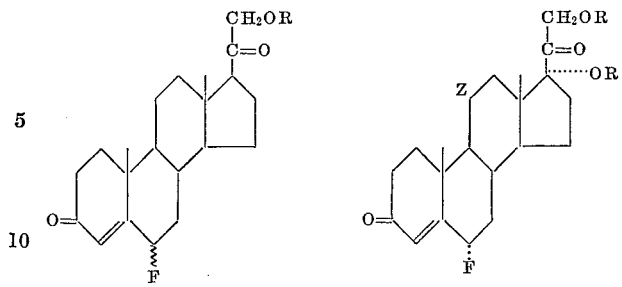

In the above formula F represents a fluorine atom both in the β and/or α configuration, Z represents two hydrogen atoms or a keto group and R represents the same groups as previously set forth.

The novel process for making the compounds of the present invention may be illustrated by the following equation:

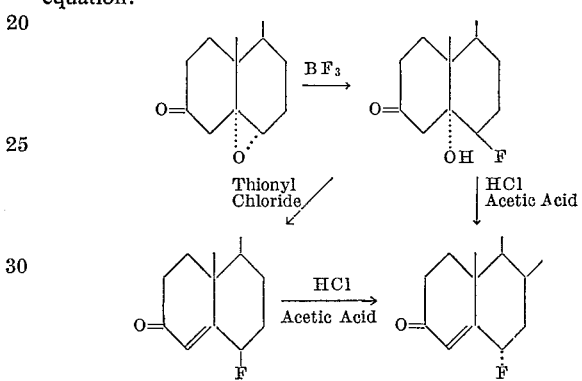

Although in the above equation the 19-methyl group is indicated, the present process is also applicable to the 19-nor compounds. Further it will be noted that the 6β-fluoro compounds are intermediates.

The fission of 5α,6α-oxido steroids, more specifically of the androstane or pregnane series with boron trifluoride or boron trifluoride-etherate or a similar complex can be carried out in an organic solvent added in such a proportion as to effect a dissolution of the steroid, and preferably in an amount from 0.1 to 5 times the weight of boron trifluoride-etherate or an equivalent weight of boron trifluoride or similar complex.

As a solvent one can use organic solvents of low polarity, such as aliphatic or aromatic hydrocarbons, ethers, chlorinated or nitrated hydrocarbons either alone or in a mixture. Typical examples of such solvents of this type are hexane, benzene, diethylether, chloroform, nitromethane and tetrahydrofurane. The reaction can be carried out at temperatures from —20° C. to the boiling point of a solvent or solvent mixture. In general, however, the reaction is best carried out at temperatures from 10 to 45° C. for maximum yields and satisfactory reaction rates. We found also that the reaction time necessary for carrying out the reaction may vary depending on the nature of the steroid and the solvent used. Thus, for example 3-cycloethyleneketal-5α,6α-oxido steroids were found to react faster than 3β-hydroxy-5α,6α-oxido steroids or their esters. The quantity of boron trifluoride used is preferably in excess of the stoichiometric quantity and in general 1 cc. of boron trifluoride-etherate for each 1 g. of steroid epoxide has been found satisfactory. The reaction is usually complete in a few hours and in practice a reaction period of 3 to 24 hours has been used.

In practicing the first step above set forth the steroid is dissolved in the solvent or solvent mixture and boron trifluoride preferably in the form of its etherate or similar complex is then added while stirring. After a period of reaction as above set forth the resultant 5α-hydroxy 6β-fluoro compound is separated and purified. It may be noted that in the first step the steroid starting material is a 3-ketone. As previously set forth compounds having in the 3 position a group convertible to a 3-keto group may also be used as for example a 3-hydroxy or an acylated 3-hydroxy group or a cycloethylene ketal group. In these instances the 3-keto group must be or will be reconstituted prior to dehydration and/or inversion at C–6. Thus, if the starting material is a 3-hydroxy steroid there is formed after the reaction with $BF_3$ the corresponding 3,5α-dihydroxy 6β-fluoro compound which is selectively oxidized by a conventional treatment with chromic acid. If there is present in the starting material a 3-acyloxy group after the $BF_3$ step the acyloxy group of the product is first conventionally saponified as with alkali metal carbonate, bicarbonate or methoxide and the 3-hydroxy group is then oxidized. If the 3-substituent is a cycloethylene ketal group then this group may be either treated with mild acid immediately after the first step to regenerate the 3-keto radical or this may take place as a result of any subsequent dehydration involving the use of acid.

The 3-keto-5α-hydroxy-6β-fluoro products or their ketals as indicated are then directly dehydrated with concomitant inversion of the 6β-fluoro atom to 6α-fluoro atom. Such dehydration was preferably carried out using anhydrous mineral acids and an organic acid as solvent; the temperature is not critical in this reaction and best yields were obtained at temperatures from 5 to 20° C.; likewise, a reaction period of 2 to 8 hours was found to give most satisfactory results. Typical examples of mineral acids of this type are dry hydrogen chloride and sulfuric acid and typical examples of organic acids are glacial acetic acid, propionic acid or butyric acid; i.e., lower aliphatic acids. In practicing the step above set forth the 5α-hydroxy-6β-fluoro steroid for example, is dissolved in glacial acetic acid and a stream of dry hydrogen is passed through the solution for 4 hours. After the reaction as above set forth, the resulting 6α-fluoro-Δ⁴-3-keto compound was separated and purified.

In the case where the 6β-fluoro was the desired product the 5α-hydroxy-6β-fluoro compound was dissolved in a basic solvent as for example pyridine, thionyl chloride was added and the temperature of the reaction mixture was kept preferably at below 0° C. Alternatively the process as above set forth was carried out using an alkali metal hydroxide as for example sodium hydroxide and an alcohol as ethanol.

Isolation and purification produced a 6β-fluoro-Δ⁴-ketocompound which was then converted into 6α-fluoro-Δ⁴-3-keto compound by treatment with dry hydrogen chloride in acetic acid as above set forth, followed by isolation and purification.

As may be understood the above reaction is applicable in general to pregnane and androstane derivatives of the character set forth. However, in some instances as indicated in the following examples the same compounds may be conveniently produced either directly or by preparing an androstane or pregnane intermediate differing in the side chain from the final compound and the side chain subsequently modified by conventional methods. Thus, for example 6α-fluoro-Δ⁴-androsten-3,17-dione may be an intermediate for the production of 6α-fluoro-testosterone and the 6α-fluoro-testosterone may also be prepared from 3-ethylenedioxy-5α,6α-oxido-androstan-17β-ol.

The following specific examples serve to illustrate the present invention but are not intended to limit the same:

Example I

A solution of 5 g. of the diacetate of Δ⁵-androsten-3β,17β-diol in 100 cc. of chloroform was mixed with 1.5 mols of monoperphthalic acid in ether solution, the mixture was kept for 20 hours at room temperature and diluted with water. The organic layer was separated, washed with water, sodium bicarbonate solution and again with water to neutral, dried, filtered and evaporated to dryness under reduced pressure. Crystallization of the residue from acetone-hexane yielded the diacetate of 5α,6α-oxido-androstan-3β,17β-diol, M.P. 158° C., [α]$_D$ −63° (chloroform).

A solution of 3 g. of the above compound in 300 cc. of a mixture of equal parts of ether and benzene was treated with 3 cc. of boron trifluoride etherate and kept for 3 hours at room temperature. The solution was then washed with water, dried over anhydrous sodium sulfate, filtered and evaporated to dryness. The residue was purified by chromatography on neutral washed alumina, thus giving the 3,17-diacetate of 6β-fluoro-androstan-3β,5α,17β-triol, M.P. 212–214° C., [α]$_D$ −31° (chloroform).

A mixture of 3.5 g. of this diacetate and a 0.2 normal solution of perchloric acid in methanol was refluxed for 2 hours, cooled, diluted with water and the precipitate was collected, washed and dried under vacuum. The residue, consisting of the crude 6β-fluoro-androstan-3β,5α,17β-triol, was purified by crystallization from acetone-hexane, thus giving the pure compound M.P. 208–209° C., [α]$_D$ ±0° (chloroform).

A solution of 3 g. of the crude triol in 150 cc. of acetone was cooled to 0° C. and treated with an 8 normal solution of chromium trioxide which was prepared by mixing 1.6 g. of chromium trioxide with concentrated sulfuric acid and water. The reagent was added dropwise to the stirred solution in the course of approximately 2 minutes, while the temperature was maintained below 0° C. The mixture was stirred for half an hour at 0° C. and then diluted with water and extracted with ether. The extract was washed with water, dried over anhydrous sodium sulfate and evaporated to dryness. The residue crystallized from ethyl acetate to give 6β-fluoro-androstan-5α-ol-3,17-dione, M.P. 227–228° C., [α]$_D$ +113° (chloroform).

2.5 g. of the above compound was dissolved in 30 cc. of pyridine, cooled to 0° C. and slowly mixed under stirring with 3 cc. of thionyl chloride, taking care that the temperature of the mixture did not rise over 0° C. The mixture was stirred for 2 hours further at 0° C. and then poured into ice water and extracted with ethyl acetate. The extract was washed with water, dilute hydrochloric acid, 5% sodium carbonate solution and water, dried over anhydrous sodium sulfate, filtered and evaporated to dryness. The residue was chromatographed on neutral washed alumina, thus giving 6β-fluoro-Δ⁴-androsten-3,17-dione, M.P. 141–143° C., ultraviolet absorption, $\lambda_{max.}$ 234 mμ, log E 4.10, [α]$_D$ +78° (chloroform).

2 g. of 6β-fluoro-Δ⁴-androsten-3,17-dione was dissolved in 80 cc. of tetrahydrofurane and the solution was added dropwise to a stirred suspension of 1.2 g. of lithium aluminum hydride in 40 cc. of tetrahydrofurane and the mixture was refluxed for 1 hour. The excess of hydride was decomposed by the cautious addition of acetone and then saturated sodium sulfate solution was added. The precipitate was removed by filtration and well washed with hot tetrahydrofurane and the combined filtrate and washings was evaporated to dryness under reduced pressure. The crude 6β-fluoro-Δ⁴-androsten-3β,17β-diol thus obtained was purified by crystallization from ethyl acetate.

2 g. of the above crude diol was dissolved in 200 cc. of chloroform, mixed with 20 g. of manganese dioxide and stirred for 24 hours at room temperature. The mixture was filtered and the solution was evaporated to dryness. Recrystallization of the residue from acetone-hexane furnished 6β-fluoro-testosterone, M.P. 169–171° C., ultraviolet absorption $\lambda_{max.}$ 234 mμ, log E 4.09; [α]$_D$ ±0°.

1 g. of 6β-fluoro-testosterone was dissolved in 50 cc. of acetic acid and a slow stream of dry hydrogen chloride was introduced into the solution for 2 hours while the temperature of the mixture was kept below 18° C. The mixture was poured into ice water and the precipitate was collected, washed with water, dried and recrystallized from acetone-hexane, thus furnishing 6α-fluoro-testosterone, M.P. 156–158° C., ultraviolet absorption $\lambda_{max.}$ 238 mμ, log E 4.17; [α]$_D$ +120° (chloroform).

Example II 1 g. of 6β-fluoro-androstan-5α-ol-3,17-dione was treated with 100 cc. of 1% methanolic potassium hydroxide for 5 minutes at room temperature and then neutralized with acetic acid, concentrated to a small volume, poured into ice water and extracted with ethyl acetate. The extract was washed with water, dried over anhydrous sodium sulfate, filtered and evaporated to dryness. The residue was purified by chromatography on neutral washed alumina to produce 6β-fluoro-Δ⁴-androsten-3,17-dione, identical to the one obtained in accordance with the method of the previous example.

Example III

The treatment of 6β-fluoro-androstan-5α-ol-3,17-dione with dry hydrogen chloride, such as has been described for this reaction in Example I, afforded, after chromatography of the crude product, 6α-fluoro-Δ⁴-androsten-3,17-dione, M.P. 227–229° C., ultraviolet absorption: $\lambda_{max}$ 234–235 m$\mu$, log E 4.19; $[\alpha]_D$ +171° (chloroform).

By reduction of the above compound to form 6α-fluoro-Δ⁴-androsten-3β,17β-diol, followed by the oxidation of the 3-hydroxyl group of this diol, following the method described in Example I (reaction with lithium aluminum hydride and with manganese dioxide, respectively), there was obtained 6α-fluoro-testosterone, identical to the final product obtained in Example I.

Example IV

A solution of 500 mg. of 6β-fluoro-Δ⁴-androsten-3,17-dione in 50 cc. of methanol was cooled to 0° C., and mixed with 34 mg. of powdered sodium borohydride which was added in small portions while the temperature was kept below 0° C. The mixture was stirred for one hour further, then neutralized with a few drops of acetic acid and diluted with water. The precipitate was collected by filtration, washed, dried and recrystallized from acetone-hexane, thus giving 6β-fluoro-testosterone, identical to the one obtained in accordance with the method of Example I.

Example V

By the same method described in the previous example, 6α-fluoro-Δ⁴-androsten-3,17-dione was converted into 6α-fluoro-testosterone.

Example VI

A mixture of 6 g. of testosterone, 110 cc. of anhydrous benzene, 40 cc. of ethyleneglycol distilled over sodium hydroxide, and 0.6 g. of p-toluenesulfonic acid was refluxed for 8 hours with the use of an adapter for the continuous removal of the water formed during the reaction. It was then cooled, sodium bicarbonate was added and the aqueous layer was separated, washed with water, dried over anhydrous sodium sulfate and evaporated to dryness under reduced pressure. Crystallization of the residue from acetone-hexane gave 3-ethylenedioxy-Δ⁵-androsten-17β-ol.

A solution of 5 g. of the above compound in 100 cc. of chloroform was cooled to 0° C. and mixed with an ether solution of monoperphthalic acid containing 1.2 mols of the reagent. The mixture was kept for 16 hours at room temperature in the dark and diluted with water. The organic layer was separated, washed with water, sodium bicarbonate solution and again with water to neutral, dried over anhydrous sodium sulfate and evaporated to dryness. The residue crystallized from acetone-hexane to give 3-ethylenedioxy-5α,6α-oxido-androstan-17β-ol.

Example VII

By the same method as the previously example, 17α-methyl and ethyl testosterones were converted into the corresponding 17α-alkyl - 3 - ethylenedioxy-5α,6α-oxido-androstan-17β-ols. The C–21 acetates and propionates of desoxycorticosterone gave the corresponding C–21 ester of 3-ethylenedioxy-5α,6α-oxido-pregnan-21-ol-20-one; increasing the amount of reagents in the ketalization step, progesterone give 3,20-bis-ethylenedioxy - 5α,6α - oxido-pregnane and similarly desoxycorticosterone gave 3,20-bis-ethylenedioxy-Δ⁵-pregnen-21-ol upon ketalization. Acetylation and propionation of the hydroxyl group of the latter compound by conventional methods, followed by epoxidation of the double bond afforded the corresponding C–21 ester of 3,20-bis-ethylenedioxy-5α,6α-oxido-pregnan-21-ol.

A solution of 2 g. of the 21-acetate of cortisone in 100 cc. of acetic anhydride was refluxed for 24 hours and then evaporated to dryness under reduced pressure. Crystallization of the crude product from methanol gave the 17,21-diacetate of cortisone. In another experiment the crude product was purified by chromatography.

Subsequent ketalization and epoxidation, in accordance with Example VI, yielded the 17,21-diacetate of 3-ethylenedioxy-5α,6α-oxido-pregnan-17α,21-diol-11,20-dione.

Similarly, the 21-propionate of cortisone gave the 17-acetate-21-propionate of cortisone and then, upon ketalization and epoxidation, the 17-acetate-21-propionate of 3-ethylenedioxy-5α,6α-oxido-pregnan - 17α,21-diol-11,20-dione.

By the same method, 9α-chloro-cortisone and 9α-fluoro-cortisone were first converted into their 17,21-diacetates and finally into the 17,21-diacetates of 9α-chloro-3-ethylenedioxy-5α,6α-oxido-pregnane - 17α,21 - diol-11,20-dione and of 9α-fluoro-3-ethylenedioxy-5α,6α-oxido-pregnane-17α,21-diol-11,20-dione, respectively. The 21-propionates of 9α-chloro-cortisone and 9α-fluoro-cortisone were converted into the 17-acetate-21-propionate of 9α-chloro-3-ethylenedioxy-5α,6α-oxido-pregnane - 17α,21 - diol-11,20-dione and of 9α-fluoro - 3 - ethylenedioxy-5α,6α-oxido-pregnane-17α,21-diol-11,20-dione, respectively.

By treatment of the 21-esters of Compound "S," cortisone or its C–9α halogenated analogues, with an acid anhydride which forms esters easily saponifiable, such as trifluoroacetic acid or the mixed anhydride of formic acid and acetic acid for example, there were obtained the corresponding 17,21-diesters of such compounds, which in turn were first ketalized at C–3 and then epoxidized at 5, 6. For example, the 21-propionate of cortisone was converted into the 17-formate-21-propionates of cortisone, of 3 - ethylenedioxy-Δ-pregnene-17α,21-diol-11,20-dione and of 3 - ethylenedioxy-5α,6α-oxido-pregnane-17α-21-diol-11, 20-dione.

Example VIII

A solution of 3 g. of 3-ethylenedioxy-5α,6α-oxido-androstan-17β-ol prepared in accordance with Example VI in 300 cc. of a mixture of equal parts of ether and benzene was mixed with 3 cc. of boron trifluoride etherate, the mixture was kept overnight at room temperature and then diluted with water. The organic layer was separated, washed with water, dried over anhydrous sodium sulfate, filtered and evaporated to dryness. The residue was purified by chromatography on neutral alumina to give 6β-fluoro-3-ethylenedioxy-androstane-5α,17β-diol.

A solution of 2 g. of the above compound in 150 cc. of acetone and 5 cc. of water was treated with 400 mg. of p-toluenesulfonic acid, the mixture was kept at room temperature for 6 hours and diluted with water. The precipitate formed was collected, washed with water and dried in vacuum. Recrystallization from acetone-hexane produced 6β-fluoro-androstane-5α,17β-diol-3-one.

1 g. of the previous compound was dissolved in 50 cc. of glacial acetic acid and a slow stream of dry hydrogen chloride was passed into the solution for 4 hours while the temperature was kept below 20° C. The mixture was poured into ice water and the precipitate was collected, washed with water, dried and recrystallized from acetone-hexane. There was thus obtained 6α-fluoro-testosterone identical to that described in Example V.

Example IX

In another experiment following the method of the previous example, there was omitted the treatment with p-toluenesulfonic acid and 6β-fluoro-3-ethylene-dioxyandrostane-5α,17β-diol was directly treated with hydrogen chloride in acetic acid solution, by the method described in the previous example for this reaction, to give 6α-fluoro-testosterone, identical to the final product obtained in Example V.

Example X

By the same methods described in Examples VIII and IX, the 17-acetate of 3-ethylenedioxy-5α,6α-oxido-androstan-17β-ol (M.P. 184–5° C. [α]$_D$ —88° (CHCl$_3$)) was converted into the acetate of 6α-fluoro-testosterone; the intermediate compounds are the 17-acetate of 6β-fluoro-3-ethylenedioxy - androstane - 5α,17β-diol (M.P. 172–164°, [α]$_D$ —56° (CHCl$_3$)) and of 6β-fluoro-androstane-5α,17β-diol-3-one, respectively.

Example XI

By the same methods as described in Examples VIII and IX, the propionate of 3-ethylenedioxy-5α,6α-oxido-androstan-17β-ol was converted into the propionate of 6α-fluoro-testosterone; the intermediate compounds were the 17-propionates of 6β-fluoro-3-ethylenedioxy-androstane-5α,17β-diol and of 6β-fluoro-androstane-5α,17β-diol-3-one.

Example XII

When in the method of Example I the diacetate of Δ$^5$-androstene-3β,17β-diol was substituted by the acetate of dhehydroepiandrosterone, there was obtained, in the epoxidation step, the acetate of 5α,6α-oxido-androstan-3β-ol-17-one and fluorination of this compound with boron triflouride gave the 3-acetate of 6β-fluoro-androstane-3β,5α-diol-17-one. Saponification to the free diolone and oxidation with 1.1 equivalents of the oxidizing reagent of chromium trioxide-aqueous sulfuric acid, furnished 6β-fluoro-androstan-5α,ol-3,17-dione, identical to the one obtained by the method of Example I; for the saponification and oxidation, there were followed the method described in such example.

Example XIII

A solution of 1 g. of the 3-acetate of 6β-fluoro-androstane-3β,5α-diol-17-one, prepared in accordance with the previous example, in 50 cc. of absolute benzene was mixed with 5 cc. of 3 N solution of methyl magnesium bromide in absolute ether and refluxed for 2 hours. The mixture was then poured into ice water, acidified with dilute hydrochloric acid and the reaction product was extracted with ethyl acetate. The extract was washed with water to neutral and the organic solvents were removed by distillation under vacuum. The residue crystallized from acetone-hexane to produce 6β-fluoro-17α-methyl-androstane-3β,5α,17β-triol.

1 g. of chromium trioxide was added in four portions to 10 cc. of anhydrous pyridine, with stirring and keeping the temperature below 30° C. by cooling in ice. This oxidizing reagent of the chromic acid-pyridine complex was then mixed with a solution of 1 g. of 6β-fluoro-17α-methyl-androstane-3β,5α,17β-triol, which was added under stirring and keeping the temperature below 20° C. The mixture was kept standing overnight at room temperature and then it was diluted with ethyl acetate, filtered through Celite and the solution was washed with dilute hydrochloric acid and with water to neutral, dried over anhydrous sodium sulfate and evaporated to drynesn under vacuum. There was thus obtained 6β-fluoro-17α-methyl-androstane-5α,17β-diol in crude form.

This crude diol was dissolved in 100 cc. of 1% methanolic potassium hydroxide and after 5 minutes at room temperature the mixture was neutralized with acetic acid, diluted with water and extracted with ether. The extract was washed with water to neutral, dried over anhydrous sodium sulfate, filtered and evaporated to dryness. Crystallization of the residue from acetone-hexane yielded 6β-fluoro-17α-methyl-testosterone.

Example XIV

When in the method of the previous example methyl magnesium bromide was substituted by ethyl magnesium bromide, there was obtained 6β-fluoro-17α-ethyl-testosterone.

Example XV

When in the method of Example XIII, the methyl magnesium bromide was substituted by acetylene magnesium bromide, there was obtained 6β-fluoro-17α-ethinyl-testosterone.

Example XVI

In other experiments, the oxidation of the 6β-fluoro-17α-alkyl (ethynyl)-androstane-3β,5α,17β-triols was carried out in acetone solution by reaction with 1.1 equivalents of chromium trioxide mixed wtih concentrated sulfuric acid and water, such as has been described for this reaction in Example No. 1.

Example XVII

A mixture of 2 g. of 6β-fluoro-Δ$^4$-androstene-3,17-dione, obtained in accordance with the method of Example No. 1, 50 cc. of dry benzene free of thiophene, 0.5 g. of pyridine hydrochloride, 4 cc. of absolute ethanol and 4 cc. of ethyl orthoformate was refluxed for 3 hours and then 5 cc. of solvent was distilled; another 4 cc. of ethyl orthoformate was added and the mixture was refluxed for 2 hours more. The solvents were removed by distillation under reduced pressure and the residue was extracted with ether; the ether solution was washed with water, dried over anhydrous sodium sulfate and evaporated to dryness. Crystallization of the residue from acetone-hexane furnished 6β-fluoro-3-ethoxy-Δ$^{3,5}$-androsta-dien-17-one.

This enol ether was treated with methyl magnesium bromide by the method described for this reaction in Example XIII, and the product of this Grignard reaction namely 6β-fluoro-17α-methyl-3-ethoxy-Δ$^{3,5}$-androstadien-17β-ol, was dissolved in 50 cc. of acetone, acidified to pH 1 by the addition of dilute hydrochloric acid (1:1), kept standing at room temperature for one hour and then diluted with water. The reaction product was extracted with ethyl acetate and the extract was washed with water, 5% sodium carbonate solution and water, dried over anhydrous sodium sulfate and evaporated to dryness under reduced pressure. The residue was crystallized from acetone-hexane, thus giving 6α-fluoro-17α-methyl-testosterone.

Example XVIII 1 g. of 6-fluoro-3-ethoxy-Δ$^{3,5}$-androstadien-17-one was dissolved in 100 cc. of a mixture of ether and benzene (1:1), mixed with 10 mols of ethyl lithium in ether solution and kept for 48 hours under nitrogen. It was then poured into water and the organic layer was separated and washed with water, dried over anhydrous sodium sulfate and evaporated to dryness. The residue was dissolved in acetone and treated with hydrochloric acid in accordance with the method of the previous example. There was thus obtained 6α-fluoro-17α-ethyl-testosterone.

Example XIX

A solution of 1 g. of 6-fluoro-3-ethoxy-Δ$^{3,5}$-androsta-dien-17-one in 40 cc. of anhydrous benzene was added under nitrogen to a cooled solution of 1 g. of potassium metal in 50 cc. of anhydrous t-butanol which had also been prepared under nitrogen. A slow stream of dry purified acetylene was introduced into the solution for 40 hours at room temperature. The mixture was poured into 200 cc. of dilute hydrochloric acid, the organic solvents were removed by steam distillation and the precipitate was filtered from the cooled mixture. Recrystallization from acetone-hexane yielded 6-fluoro - 17α - ethynyl-3-ethoxy-Δ$^{3,5}$-androstadien-17β-ol.

Hydrolysis of the ether group of the latter compound, as described for this reaction in Example No. XVII afforded 6β-fluoro-17α-ethinyl-testosterone in crude form, which was purified by recrystallization from acetone-hexane.

Example XX

A suspension of 100 mg. of 2% palladium in calcium carbonate catalyst in 20 cc. of pure pyridine was stirred under hydrogen until the uptake of hydrogen ceased; there was then added 1 g. of 6α-fluoro-17α-ethynyl testosterone and the mixture was hydrogenated at room temperature and atmospheric pressure until 1.05 mols of hydrogen were absorbed, which took approximately half an hour. The catalyst was removed by filtration, the pyridine solution was diluted with water and extracted exhaustively with ethyl acetate. Evaporation of the solvent and purification gave 6α-fluoro-17α-vinyl testosterone.

Example XXI

A mixture of 1 g. of 6β-fluoro-testosterone, 10 cc. of pyridine and 1 cc. of acetic anhydride was kept at room temperature for 4 hours and then poured into ice water, and extracted with methylene dichloride. The extract was consecutively washed with water, dilute hydrochloric acid, 5% sodium carbonate solution and water, dried over anhydrous sodium sulfate and evaporated to dryness. Crystallization from acetone furnished the acetate of 6β-fluoro-testosterone.

Example XXII

When in the method of the previous example 6β-fluoro-testosterone was substituted by 6α-fluoro-testosterone and the acetic anhydride was substituted by propionic anhydride, there was obtained the propionate of 6α-fluoro-testosterone. Similarly, by treatment with corresponding anhydrides or chlorides of hydrocarbon carboxylic acids having up to 12 carbon atoms, there were obtained the corresponding esters of 6α-fluoro-testosterone and of 6β-fluoro-testosterone. Specifically these were the enanthate, cyclopentylpropionate and benzoate.

Example XXIII

When in the method of the previous example 6α-fluoro-testosterone was substituted by 6α-fluoro-17α-ethynyl testosterone and the more drastic conditions conventionally employed for esterification of tertiary alcohols were used (reflux and acid conditions) there were obtained the acetate, and cyclopentylpropionate of 6α-fluoro-17α-ethynyl testosterone. In the same there was also made the 17-acetate, propionate, cyclopentylpropionate and benzoate of 17α-methyl and 17α-ethyl-6α-fluoro-testosterone.

Example XXIV

By the process as described in the previous example there was obtained the acetate and propionate of 6α-fluoro-17α-vinyl-testosterone.

Example XXV

By the same methods as described in Examples 8 and 9, 17-methyl-3-ethylenedioxy-5β,6β-oxido-androstan-17β-ol was converted into 17-methyl-6α-fluoro-testosterone; the intermediate compounds were 17α-methyl-6β-fluoro-3-ethylenedioxy-androstane-5α,17β-diol and 17α-methyl-6β-fluoro-androstane-5α,17β-diol-3-one, respectively.

Example XXVI

By the same methods as described in Examples Nos. 8 and 9, 17α-ethyl-3-ethylenedioxy-5α,6α-oxido-androstan-17β-ol was converted into 17α-methyl-6α-fluoro-testosterone; the intermediate compounds were 17α-ethyl-6β-fluoro-3-ethylenedioxy-androstane-5α,17β-diol and 17α-ethyl-6β-fluoro-androstane-5α,17β-diol-3-one, respectively.

Example XXVII

A solution of 5 g. of 17α-ethinyl-19-nor-Δ⁵-androstene-3β,17β-diol in 100 cc. of chloroform was treated with an ether solution of monoperphthalic acid containing 1.2 molar equivalents of the reagent and the mixture was allowed to react at room temperature in the dark for 20 hours. It was then diluted with water, the organic layer was separated and washed with aqueous sodium bicarbonate solution and water, dried over anhydrous sodium sulfate and evaporated to dryness under reduced pressure. The residue was purified by chromatograhpy on neutral alumina to produce 17α-ethinyl-5α, 6α-oxido-19-nor-androstane-3β,17β-diol.

3 g. of the above compound was dissolved in a mixture of 150 cc. of ether and 150 cc. of benzene, cooled to 0° C. and treated dropwise with stirring with 3 cc. of boron trifluoride etherate. After 3 hours standing at room temperature, the mixture was diluted with water and the organic layer was washed with water, dried over anhydrous sodium sulfate and evaporated to dryness. Chromatographic purification of the residue on neutral alumina yielded 17α-ethinyl-6β-fluoro-19-nor-androstane-3β, 5α,17β-triol.

A solution of 2 g. of the above triol in 100 cc. of acetone was cooled to 0° C. and treated with 8 N solution of chromic acid prepared by mixing chromium trioxide, concentrated sulfuric acid and water; the reagent was added to the stirred solution kept at 0° C. under nitrogen, in the course of approximately 3 minutes, until the yellow color of the mixture persisted. The stirring was continued for a further 5 minutes at 0° C. and then the mixture was diluted with water and extracted with ether. The extract was washed with water, dried over anhydrous sodium sulfate and evaporated to dryness. Recrystallization of the residue from ethyl acetate furnished 17α-ethinyl-6β-fluoro-19-nor-androstane-5α,17β-diol-3-one.

1 g. of 17α-ethinyl-6β-fluoro-19-nor-androstane-5α,17β-diol-3-one was mixed with 50 cc. of glacial acetic acid and a slow stream of dry hydrogen chloride was introduced into the mixture for 2 hours while the temperature was kept below 18° C. The mixture was poured into water and the precipitate formed was collected by filtration, washed with water, dried and recrystallized from acetone-hexane, thus giving 17α-ethinyl-6α-fluoro-19-nor-testosterone.

Example XXVIII

A mixture of 2 g. of 17α-methyl-6α-fluoro-testosterone, 100 cc. of anhydrous tertiary butanol, 0.8 g. of selenium dioxide and 0.5 cc. of pyridine was refluxed for 72 hours under an atmosphere of nitrogen, cooled, filtered through Celite, washing the filter with hot t-butanol, and the combined filtrate and washings was evaporated to dryness under reduced pressure. The residue was disolved in acetone, treated with recolorizing charcoal, dried over anhydrous sodium sulfate and evaporated to dryness; the residue was purified by chromatography on neutral alumina. There was thus obtained 17α-methyl-6α-fluoro-$\Delta^{1,4}$-androstadien-17β-ol-3-one. In the same way starting with 17-acetate and propionate of 17α-methyl-6α-fluoro-testosterone there was obtained the corresponding $\Delta^{1,4}$-compounds.

Example XXIX

By the method of the previous example, 17α-ethynyl-6α-fluoro-testosterone was converted into 17α-ethynyl-$\Delta^{1,4}$-6α-fluoro-androstadien-17β-ol-3-one.

Example XXX

By the method of Example No. 28, 17α-vinyl-6α-fluoro-testosterone was converted into 17α-vinyl-6α-fluoro-$\Delta^{1,4}$-androstadien-17β-ol-3-one.

Example XXXI 5 g. of the acetate of Δ⁵-pregnen-3β-ol-20-one was treated with monoperphthalic acid and the product was worked up by the method described in Example No. 1. There was thus obtained the acetate of 5α,6α-oxido-pregnan-3β-ol-20-one, M.P. 168–169°, [α]$_D$ +9° (chloroform).

Following the method described in Example I boron trifluoride etherate fission of the above 5α,6α-oxido compounds produced the 3-acetate of 6β-fluoro-pregnane-3β,5α-diol-20-one, MP. 223–224° C. $[α]_D=42°$ (chloroform); hydrolysis of the acetyl group of the latter compound gave the free 6β-fluoro-pregnane-3β,5α-diol-20-one, and oxidation of the hydroxyl group at C–3 furnished 6β-fluoro-pregnan-5α-ol-3,20-dione, M.P. 274–278° C., $[α]_D=81°$ (pyridine).

The diolone was dehydrated by the reactions described in Examples I and II and the dehydration product was worked up in the form indicated; the dehydration by means of thionyl chloride or methanolic potassium hydroxide yielded 6β-fluoro-progesterone, M.P. 156–158°, ultraviolet absorption: λ max. 234 mμ, log E 4.12; the dehydration by treatment with dry hydrogen chloride produced 6α-fluoro-progesterone, M.P. 146–80, λ max. 236 mμ, log E 4.19, $[α]_D$ +191° (chloroform).

Example XXXII

By the same methods described in Examples VIII and IX, 3,20-bisethylenedioxy-5α,6α-oxido-pregnane was converted into 6α-fluoro-progesterone (M.P. 146–8° C., identical to that described in Example XXXI); the intermediate compounds were 6β-fluoro-3,20-bis-ethylenedioxy-pregnan-5α-ol and 6β-fluoro-pregnan-5α-ol-3,20-dione, respectively.

Example XXXIII

When in the method of Example XXXI the acetate of Δ⁵-pregnen-3β-ol-20-one was substituted by the 3,17-diacetate of Δ⁵-pregnene-3β,17α-diol-20-one, there was obtained as final product the acetate of 6α-fluoro-17α-hydroxy-progesterone, or of its 6β-isomer, respectively.

Example XXXIV

When in the method of Example XXXI, the diacetate of Δ⁵-pregnene-3β,17α-diol-20-one was substituted by a mixed diester of this compound, whose acyloxy group at C–17 was the propionate and caproate, there was obtained the corresponding ester of 6α-fluoro-17α-hydroxy-progesterone or of its 6β-isomer. Thus, we obtained from the corresponding 3-acetate-17-acylate of Δ⁵-pregnene-3β,17α-diol-20-one the propionate and the caproate of the 6-fluoro-17α-hydroxy-progesterone.

Example XXXV

By the same methods as described in Examples VIII and IX, 17-acetate of 3-ethylenedioxy-5α,6α-oxido-pregnan-17α-ol-20-one was converted into the 17-acetate of 6α-fluoro-17α-hydroxy-progesterone (M.P. 249–51° C., $[α]_D$ +55° (CHCl₃)); the intermediate compounds were the 17-acetates of 6β-fluoro-3-ethylenedioxy-pregnane-5α,17α-diol-20-one and of 6β-fluoro-pregnane-5α,17α-diol-3,20-dione, respectively.

Example XXXVI

By the same methods as described in Examples Nos. VIII and IX, 17-caproate of 3-ethylenedioxy-5α,6α-oxido-pregnan-17α-ol-20-one was converted into the 17-caproate of 6α-fluoro-17α-hydroxy-progesterone; the intermediate compounds were the 17-caproates of 6β-fluoro-3-ethylenedioxy-pregnane-5α,17α-diol-20-one and of 6β-fluoro-pregnane-5α,17α-diol-20-one and of 6β-fluoro-pregnane-5α,17α-diol-3,20-dione, respectively.

Example XXXVII

A mixture of 5 g. of the 3-acetate of Δ⁵-pregnene-3β,17α-diol-20-one, 300 cc. of anhydrous benzene, 35 cc. of ethylene glycol and 250 mg. of p-toluenesulfonic acid was refluxed for 12 hours with the use of an adapter for the continuous removal of the water formed during the reaction. There was then added 50 cc. of a 2 N solution of sodium carbonate and 200 cc. of water and the benzene layer was separated, washed with water, dried over anhydrous sodium sulfate and evaporated to dryness under reduced pressure. There was thus obtained the 3-acetate of 20-ethylenedioxy-Δ⁵-pregnene - 3β,17α - diol in crude form, which was used for the next step without further purification. In another experiment the pure substance was obtained by several recrystallizations from acetone-hexane.

A cooled solution of 5 g. of the crude 3-acetate of 20-ethylenedioxy-Δ⁵-pregnene-3β,17α-diol in 100 cc. of chloroform was mixed with an ether solution of monoperphthalic acid containing 1.2 mols of the peracid and the mixture was allowed to stand at 0–5° C. overnight in the dark; it was then mixed with water and the organic layer was separated and washed with water, dried over anhydrous sodium sulfate and evaporated to dryness. The residue was chromatographed on neutral alumina, thus yielding the 3-acetate of 20-ethylenedioxy-5α,6α-oxido-pregnane-3β,17α-diol.

A solution of 3 g. of the above compound in a mixture of equal parts of ether and benzene was cooled in 0° C. and mixed with 3 cc. of boron trifluoride etherate. After 3 hours standing at room temperature it was diluted with water and the organic layer was separated, washed with water, dried over anhydrous sodium sulfate, filtered and evaporated to dryness. Chromatography of the residue on neutral alumina furnished the 3-acetate of 6β-fluoro-20-ethylenedioxy-pregnane-3β,5α,17α-triol.

500 mg. of lithium aluminum hydride was added to a solution of 1 g. of the 3-acetate of 6β-fluoro-20-ethylene dioxy-pregnane-3β,5α,17α-triol in 50 cc. of tetrahydrofurane and refluxed for 1 hour. After cooling, the excess of hydride was decomposed by the cautious addition of ethyl acetate and then saturated aqueous sodium sulfate solution was added, followed by anhydrous sodium sulfate. The inorganic precipitate was removed by filtration and the filtrate was evaporated to dryness under reduced pressure. There was thus obtained 6β-fluoro-20-ethylenedioxy-pregnane-3β,5α,17α-triol in crude form; in another experiment the pure substance was prepared by recrystallization from acetone-hexane.

A solution of 800 mg. of chromium trioxide in a mixture of 3 cc. of pyridine and 1 cc. of water was added to a solution of the above crude triol in 10 cc. of pyridine previously cooled at 0° C. The mixture was kept standing overnight at room temperature and then diluted with 50 cc. of ethyl acetate and filtered through Celite, washing the filter with a little ethyl acetate. The combined filtrate and washings was washed several times with saturated aqueous sodium chloride solution, dried over anhydrous sodium sulfate, filtered and evaporated to dryness. Crystallization of the residue of from acetone-hexane afforded 6β-fluoro-20-ethylenedioxy-pregnane-5α,17α-diol-3-one.

A slow stream of dry hydrogen chloride was introduced for 3 hours into a suspension of 1 g. of the above compound in 15 cc. of glacial acetic acid, maintaining the temperature below 20° C. After pouring into water the precipitate was collected by filtration and recrystallized from acetone-hexane, thus yielding 6α-fluoro-17α-hydroxyprogesterone.

Example XXXVIII

A mixture of 1 g. of the crude 6β-fluoro-20-ethylenedioxy-3β,5α,17α-diol, described in the previous example, 50 cc. of acetone containing 1 cc. of water and 100 mg. of p-toluenesulfonic acid was kept for 6 hours at room temperature and then diluted with water. The precipitate was collected, washed with water and dried under vacuum. There was thus obtained 6β-fluoro-pregnane-3β,5α,17α-triol in crude form. The pure substance was obtained in another experiment by recrystallization from methanol.

800 mg. of the above crude triolone dissolved in 8 cc. of pyridine was treated with a solution of 660 mg. of chromium trioxide in 2.4 cc. of pyridine and 0.8 cc. of water, such as has been described in this oxidation in the previous example, to produce 6β-fluoro-pregnane-5α,17α-diol-3,20-dione.

The conversion of the above compound into 6α-fluoro-17α-hydroxy-progesterone was carried out as described in Example XXXVII.

Example XXXIX

In another experiment, 1 g. of the crude 3-acetate of 20 - ethylenedioxy-5α,6α-oxido-pregnane-3β,17α-diol, obtained in accordance with Example XXXVII, was refluxed in 50 cc. of 1% methanolic potassium hydroxide in order to saponify the ester group at C–3; by the same method as described in Example No. XXXVII, there was then carried out the reaction with boron trifluoride etherate to produce 6β-fluoro-20-ethylenedioxy-pregnane-3β,5α,17α-triol, identical with the intermediate described in such example.

Example XL

A mixture of 5 g. of 17α-hydroxyprogesterone, 300 cc. of anhydrous benzene, 35 cc. of ethyleneglycol and 250 mg. of p-toluenesulfonic acid was refluxed for 12 hours with the use of an adapter for the continuous removal of the water formed during the reaction and then cooled and treated with 50 cc. of 2 N aqueous sodium carbonate solution and 500 cc. of water. The benzene layer was separated and washed with water, dried over anhydrous sodium sulfate and evaporated to dryness under reduced pressure. There was thus obtained the crude 3,20-bis-ethylene-dioxy-$\Delta^5$-pregnen-17α-ol.

A cooled solution of 5 g. of the above crude ketal in 100 cc. of chloroform was mixed with an ether solution of monoperphthalic acid containing 1.2 molar equivalents of the reagent and the mixture was kept for 16 hours at a temperature of 0.5° C., in the dark, and then diluted with water. The organic layer was separated, washed with water, dried over anhydrous sodium sulfate, filtered and evaporated to dryness. Chromatography of the residue on neutral alumina yielded 3,20-bis-ethylenedioxy - 5α,6α-oxido-pregnan-17α-ol.

A solution of 3 g. of the above compound in a mixture of 150 cc. of ether and 150 cc. of benzene was cooled to 0° C., mixed with 3 cc. of boron trifluoride etherate and kpet standing at room temperature for 3 hours. It was then diluted with water and the organic phase was dried over anhydrous sodium sulfate, filtered and evaporated to dryness. The residue was purified by chromatography on neutral alumina, thus giving 6β-fluoro-3,20-bis-ethylenedioxy-pregnane-5α,17α-diol.

A slow stream of dry hydrogen chloride was introduced for 3 hours into a solution of 2 g. of the above compound in 100 cc. of glacial acetic acid, while the temperature was maintained below 18° C.; it was then poured into water and the precipitate was collected by filtration, washed with water, dried and recrystallized from acetone-hexane. There was thus produced 6α-fluoro-17α-hydroxyprogesterone identical to that described in Example XXXVII.

Example XLI 800 mg. of p-toluenesulfonic acid was added to a solution of 5 g. of 6β-fluoro-3,20-bis-ethylenedioxy-pregnane-5α,17α-diol-prepared in accordance with the previous example in 300 cc. of acetone and the mixture was allowed to stand for 6 hours at room temperature. After diluting with water the precipitate was collected by filtration, washed, dried under vacuum and recrystallized from acetone-hexane, thus furnishing 6β-fluoro-pregnane-5α,17α-diol-3,20-dione.

3 cc. of thionyl chloride was slowly added to a stirred solution of 2.5 g. of 6β-fluoro-pregnane-5α,17α-diol-3,20-dione in 30 cc. of pyridine, maintaining the temperature of the mixture at 0° C. The stirring was continued for 2 hours further at 0° C. and the mixture was then poured into ice water and the reaction product was extracted with several portions of ethyl acetate. The extract was washed with water, dilute hydrochloric acid, 5% sodium carbonate solution and water, dried over anhydrous sodium sulfate, filtered and evaporated to dryness. Chromatography of the residue on neutral alumina afforded 6β-fluoro-17α-hydroxyprogesterone.

Following exactly the method described in Example No. XL, there was inverted the steric configuration of 6β-fluoro-17α-hydroxyprogesterone by treatment with dry hydrogen chloride in acetic acid solution and 6α-fluoro-17α-hydroxyprogesterone was obtained after isolation and purification.

Example XLII

A mixture of 6β-fluoro-pregnane-5α,17α-diol-3,20-dione and 100 cc. of 1% methanolic potassium hydroxide was stirred for 5 minutes at room temperature, acidified with acetic acid, concentrated to a small volume, diluted with ice water and extracted with ethyl acetate. The product was then worked up as described in the previous example, to give 6β-fluoro-17α-hydroxyprogesterone, identical with the one obtained in accordance with the previous example.

Example XLIII

In another experiment, 2 g. of 6β-fluoro-pregnane-5α,17α-diol-3,20-dione, obtained in accordance with Example No. XLI was treated in glacial acetic acid solution with dry hydrogen chloride as has been described in Example No. XL, thus producing 6α-fluoro-17α-hydroxyprogesterone, identical with the one obtained in accordance with that example.

Example XLIV

A mixture of 2 g. of 6α-fluoro-17α-hydroxyprogesterone, 10 cc. of acetic anhydride and 200 mg. of p-toluenesulfonic acid was stirred for 12 hours at room temperature and then poured into water. The mixture was heated for half an hour on the steam bath and cooled and the precipitate formed was collected, washed with water and dried. There was thus obtained the crude diacetate of 6-fluoro-$\Delta^{3,5}$-pregnadiene-3,17-diol-20-one. In another experiment the product was purified by chromatography on neutral alumina.

The above crude 3-enol-acetate-17-acetate was dissolved in 100 cc. of 1% methanolic potassium hydroxide, cooled to 5–10° C. and allowed to stand at this temperature for 1 hour; it was then neutralized with acetic acid, concentrated to a small volume, diluted with water and the precipitate was collected, washed with water, dried and recrystallized from acetone-hexane. There was thus obtained the acetate of 6α-fluoro-17α-hydroxyprogesterone, identical with that obtained in Example No. XXXIII.

Example XLV

By the same method as described in the previous examples, 1 g. of 6β-fluoro-17α-hydroxyprogesterone was treated with 12 cc. of propionic anhydride and 200 mg. of p-toluenesulfonic acid, to produce the dipropionate of 6-fluoro-$\Delta^{3,5}$-pregnadiene-3,17α-diol-20-one and then the enol-ether group of this compound was hydrolyzed to form the propionate of 6α-fluoro-17α-hydroxy-progesterone.

Example XLVI

A mixture of 1 g. of 6α-fluoro-17α-hydroxyprogesterone, 50 cc. of anhydrous benzene, 5 g. of caproic anhydride and 400 mg. of p-toluenesulfonic acid was allowed to stand at room tempreature for 3 days and then poured into water. The organic layer was separated and washed with aqueous sodium bicarbonate solution and water, dried over anhydrous sodium sulfate and evaporated to dryness. The residue was treated with methanolic potassium hydroxide, as described in the previous example, and the product was recrystallized from acetone-hexane. There was thus obtained the 17-caproate of 6α-fluoro-17α-hydroxyprogesterone.

Example XLVII

Applying the method of Example XXVIII, 6α-fluoro-progesterone was converted into 6α-fluoro-Δ$^{1,4}$-pregnadiene-3,20-dione.

Example XLVIII

By dehydrogenation of 6α-fluoro-17α-hydroxy-progesterone 17-acetate, in accordance with Example No. XXVIII, there was obtained 6α-fluoro-Δ$^{1,4}$-pregnadien-17α-ol-3,20-dione 17-acetate.

Example XLIX

By an analogous method to that described in Example XXVIII, 17α-propyl-6α-fluoro-testosterone 17-propionate was converted into 17α-propyl-6α-fluoro-Δ$^{1,4}$-androstadien-17β-ol-3-one 17-propionate.

Example L

A mixture of 5 g. of 21-fluoro-17α-acetoxy-progesterone, 100 cc. of anhydrous benzene, 35 cc. of ethyleneglycol distilled over sodium hydroxide and 600 mg. of p-toluenesulfonic acid was refluxed for 8 hours with the use of an adapter for the continuous removal of the water formed during the reaction. Sodium bicarbonate solution was added to the cooled mixture and the organic layer was separated and washed with water, dried over anhydrous sodium sulfate and evaporated to dryness. The residue crystallized from acetone-hexane to yield 21-fluoro-17α-acetoxy-3-ethylene-dioxy-Δ$^5$-pregnen-20-one.

4 g. of the above compound was dissolved in 80 cc. of chloroform, cooled to 0° C. and mixed with an ether solution of monoperphthalic acid containing 1.2 molar equivalents of the reagent. The mixture was kept in the dark for 16 hours at a temperature between 0 and 5° C. and then diluted with water. The organic layer was washed with aqueous sodium bicarbonate solution and then with water to neutral, dried over anhydrous sodium sulfate and evaporated to dryness. The residue crystallized from acetone-hexane to give 21-fluoro-17α-acetoxy-3-ethylenedioxy-5α,6α-pregnan-20-one.

To a solution of 3 g. of the above compound in 300 cc. of a mixture of equal parts of ether and benzene there was added 3 cc. of boron trifluoride etherate and the mixture was kept standing at room temperature for 3 hours. After diluting with water the organic layer was separated, washed with water, dried over anhydrous sodium sulfate and evaporated. Chromatography of the residue on neutral alumina afforded 6β,21-difluoro-17α-acetoxy-3-ethylenedioxy-pregnan-5α-ol-20-one.

2 g. of the above compound was dissolved in 150 cc. of acetone, mixed with 3 cc. of water and 400 mg. of p-toluenesulfonic acid monohydrate and the mixture was kept at room temperature for 6 hours and diluted with water. The precipitate was filtered, washed with water and dried, thus giving 6β,21-difluoro-17α-acetoxy-pregnan-5α-ol-3,20-dione in crude form. In another experiment the pure compound was obtained by recrystallization from acetone-hexane.

A solution of the above crude compound in 100 cc. of acetic acid was treated with 2 cc. of concentrated hydrochloric acid and the mixture was kept at room temperature for 1½ hours. After diluting with water the precipitate formed was collected, washed with water, dried and recrystallized from acetone-hexane. There was thus obtained 6β,21-difluoro-17α-acetoxy-progesterone.

1.5 g. of 6β,21-difluoro-17α-acetoxy-progesterone was dissolved in 75 cc. of glacial acetic acid and a snow stream of dry hydrogen chloride was introduced into the solution for 4 hours, maintaining the temperature below 15° C. It was then poured into ice water and the precipitate was filtered, washed with water, dried and recrystallized from acetone-hexane. There was thus obtained 6α,21-difluoro-17α-acetoxy-progesterone.

Example LI

In another experiment 2 g. of 6β,21-difluoro-17α-acetoxy-3-ethylene-dioxy-pregnan-5α-ol-20-one, intermediate compound in the previous example, was treated with dry hydrogen chloride in glacial acetic acid solution such as has been described in such example, to produce in this manner directly 6α,21-difluoro-17α-acetoxy-progesterone.

Example LII 21-fluoro-17α-propionoxy-progesterone was treated with propylene glycol to produce 21-fluoro-17α-propionoxy-3-propylene-dioxy-Δ$^5$-pregnen-20-one; the reaction of the latter with the peracid led to 21-fluoro-17α-propionoxy-5α,6α-oxido-3-propylenedioxy-pregnan-20-one, which was treated with boron trifluoride etherate to produce 6β,21-difluoro - 17α - propionoxy - 3 - propylenedioxy-pregnan-5α-ol-20-one; the latter was converted through 6β,21-difluoro - 17α - propionoxy - pregnan-5α-ol-3,20-dione and 6β,21-difluoro-17α-propionoxy-progesterone by the same methods as described in Example L into 6α-21-difluoro-17α-propionoxy-progesterone.

Example LIII 1.0 g. of 6α,21-difluoro-17α-acetoxy progesterone was treated with ethyl orthoformate to produce 6,21-difluoro-17α-acetoxy-3-ethoxy-Δ$^{3,5}$-pregnadiene-20-one; similarly, 6β,21-difluoro-17α-propionoxy-progesterone was converted into 6,21-difluoro-17α-propionoxy-3-propoxy-Δ$^{3,5}$-pregnadiene-20-one by reaction with propyl orthoformate.

Example LIV

A mixture of 2 g. of 6α,21-difluoro-17α-acetoxy-progesterone, 100 cc. of t-butanol, 0.8 g. of selenium dioxide and 0.4 cc. of pyridine was refluxed under an atmosphere of nitrogen for 48 hours and then filtered through Celite, washing the filter with hot t-butanol. The combined filtrate and washings was evaporated to dryness and the residue was treated with decolorizing charcoal in acetone solution under reflux for one hour. The solution was filtered through Celite and the solvent was evaporated. Chromatographic purification of the residue on neutral alumina furnished 6α,21-difluoro-17α-acetoxy-Δ$^{1,4}$-pregnadiene-3,20-dione.

Example LV

By the same methods described in Examples VIII and IX, 21-acetate of 3-ethylenedioxy-5α,6α-oxido-pregnan-21-ol-20-one prepared from Δ$^4$-pregnan-21-ol-3,20-dione-21-acetate as described in the said example was converted into the 21-acetate of 6α-fluoro-desoxycorticosterone; the intermediate compounds were the 21-acetates of 6β-fluoro-3-ethylenedioxy-pregnane-5α,21-diol-20-one and of 6β-fluoro-pregnane-5α,21-diol-3,20-dione, respectively.

Example LVI

By the same methods as described for the above example, 21-propionate of 3,20-bis-ethylenedioxy-5α,6α-oxido-pregnan-21-ol was converted into the 21-propionate of 6α-fluoro-desoxycorticosterone; the intermediate compounds were the 21-propionates of 6α-fluoro-3,20-bis-ethylenedioxy-pregnane-5α,21-diol and of 6β-fluoro-pregnane-5α,21-diol-3,20-dione, respectively.

Example LVII

By the same methods as described in Examples VIII and IX, 17,21-diacetate of 3-ethylenedioxy-5α,6α-oxido-pregnane-17α,21-diol-20-one (M.P. 186–8° C., [α]$_D$ −78° (CHCl$_3$) prepared from Δ$^4$-pregnane-17,21-diol-3,20-dione diacetate was converted into the 17,21-diacetate of 6α-fluoro-Δ$^4$-pregnene-17α,21-diol-3,20-dione (M.P. 241–2°, [α]$_D$ +53°, λmax. 236 Mμ, log E 4.17), the intermediate compounds were the 17,21-diacetates of 6β-fluoro-3-ethylenedioxy - pregnane-5α,17α,21-triol-20-one and of 6β-fluoro-pregnane-5α,17α-21-triol-3,20-dione, respectively.

Example LVIII

By the same methods as described in Examples VIII and IX, 17,21-diacetate of 3-ethylenedioxy-5α,6α-oxido-pregnane-17α,21-diol-11,20-dione prepared from Δ⁴-pregnen-17α,21-diol-3,11,20-trione was converted into the 17,21-diacetate of 6α-fluoro-cortisone by boron trifluoride fission of the 5α,6α-epoxide and subsequent preparative methods as above set forth; the intermediate compounds were the 17,21-diacetates of 6α-fluoro-3-ethylenedioxy-pregnane-5α,17α-21-triol-11,20-dione and of 6α-fluoro-pregnane-5α,17α,21-triol-3,11,20-trione, respectively.

Example LVIX

By the same methods as described in the previous example 17,21-diacetate of 9α-chloro-3-ethylenedioxy-5α,6α-oxido-pregnane-17α,21-diol-11,20-dione was converted into the 17,21-diacetate of 6α-fluoro-9α-chloro-cortisone; the intermediate compounds were the 17,21-diacetates of 6β-fluoro-9α-chloro-3-ethylenedioxy-pregnane-5α,17α-21-triol-11,20-dione and of 6β-fluoro-9α-chloro-pregnane-5α,17α,21-triol-3,11,20-trione, respectively.

Example LX

By the same methods as above set forth in Example LVIX 17,21-diacetate of 9α-fluoro-3-ethylenedioxy-5α,6α-oxido-pregnane-17α,21-diol-11,20-dione was converted into the 17,21-diacetate of 6α,9α-difluoro-cortisone; the intermediate compounds were the 17,21-diacetates of 6β,9α-difluoro-3-ethylenedioxy-pregnane-5α,17α,21-triol-11,20-dione and of 6β,9α-difluoro-pregnane-5α,17α,21-triol-3,11,20-trione, respectively.

Example LXI

A mixture of 1 g. of the 21-acetate of 6α-fluoro-desoxycorticosterone prepared in accordance with Example LV, and 10 cc. of anhydrous methanol was mixed with a methanol solution of sodium methoxide, prepared by dissolving 70 mg. of sodium metal in absolute methanol, and the mixture was stirred for 1 hour at 0° C. and under an atmosphere of nitrogen. After acidifying with a few drops of acetic acid the mixture was diluted with water and the precipitate was collected, dried and recrystallized from acetone-hexane, thus giving the free 6α-fluoro-desoxycorticosterone.

A mixture of 500 mg. of 6α-fluoro-desoxycorticosterone, 5 cc. of anhydrous pyridine and 0.6 cc. of propionic anhydride was kept standing overnight at room temperature and then poured into water. The mixture was heated for half an hour on the steam bath, cooled and the precipitate was collected, washed with water, dried and recrystallized from acetone-hexane, thus yielding the 21-propionate of 6α-fluoro-desoxycorticosterone.

Example LXII

By the same methods as described in Example LXI the esterified groups at C–17 and C–21 of 6α-fluoro-Δ⁴-pregnene-17α,21-diol-3,20-dione were saponified and the free alcohols obtained by purification. The free 21-alcohol was then esterified with propionic anhydride as described in Example LXI to furnish after isolation and purification 6α-fluoro-Δ⁴-pregnene-17α,21-diol-3,20-dione-2-propionate.

Example LXIII

By the same method as described in Example XXVIII 6α-fluoro-testosterone acetate and 6β-fluoro-testosterone were converted into the corresponding Δ¹,⁴ compounds by oxidation with selenium dioxide.

Example LXIV

By the same method as described in the above example the cyclopentylpropionates of 6α-fluoro-testosterone and 6β-fluoro-testosterone were converted into the corresponding Δ¹,⁴-compounds.

Example LXV 2.0 g. of 6α-fluoro-progesterone was dissolved in 14 cc. of anhydrous dioxane; 2 cc. of ethyl ortho formate and 60 mg. of p-toluenesulfonic acid were added and the solution was stirred at room temperature for 30 minutes; the reaction mixture was cooled, diluted with 200 cc. of water containing 5 cc. of pyridine, extracted with ether, the etheral extract washed with water, dried over anhydrous sodium sulfate and evaporated to dryness. Purification of the crude residue by crystallization from hexane-acetone gave 3-ethoxy-6-fluoro-Δ³,⁵-pregnadien-20-one.

Example LXVI

By the same method as described in the previous example 6β-fluoro-progesterone was converted into the same 3-ethyl enol ether of 6-fluoro-progesterone.

Example LXVII

By the same method as described Example LXV the 17-acetate and caproate of 6α-fluoro-Δ⁴-pregnen-17α-ol-3,20-dione were converted into the corresponding 3-ethyl enol ethers.

Example LXVIII

By the same method as above substituting the ethyl ortho formate for propyl ortho formate there were obtained the 17 acetate and propionate of 3-propoxy-Δ³,⁵-pregnadien-17α-ol-20-one 6-fluoro derivative.

We claim:

1. A compound of the following formula:

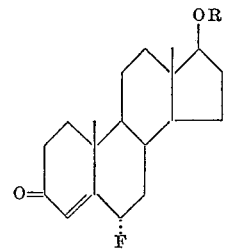

wherein R is selected from the group consisting of hydrogen and a hydrocarbon carboxylic acyl group of less than 12 carbon atoms.

2. The hydrocarbon carboxylic acid esters of less than 12 carbon atoms of 6α-fluoro-testosterone.

3. A compound of the following formula:

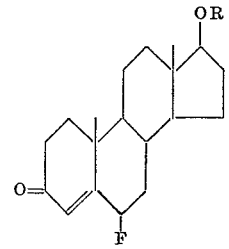

wherein R is selected from the group consisting of hydrogen and a hydrocarbon carboxylic acyl group of less than 12 carbon atoms.

4. A compound of the following formula:

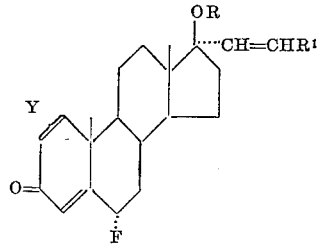

wherein R is selected from the group consisting of hydrogen and a hydrocarbon carboxylic acyl group of less than 12 carbon atoms, R¹ is a lower alkyl group and Y is selected from the group consisting of a double bond between C–1 and C–2 and a saturated linkage between C–1 and C–2.

5. 6α-fluoro-17α-vinyl-Δ⁴-androsten-17β-ol-3-one.

6. The hydrocarbon carboxylic acid esters of less than 12 carbon atoms of 6α-fluoro-17α-lower alkenyl-Δ⁴-androsten-17β-ol-3-one.

7. 6α-fluoro-17α-vinyl-Δ¹,⁴-androstadien-17β-ol-3-one.

8. The hydrocarbon carboxylic acid esters of less than 12-carbon atoms of 6α-fluoro-17α-lower alkenyl-Δ¹,⁴-androstadien-17β-ol-3-one.

9. A compound of the following formula:

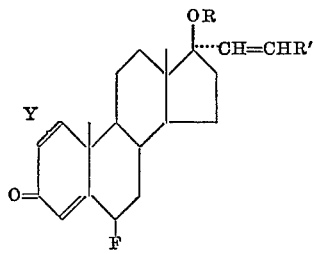

wherein R is selected from the group consisting of hydrogen and a hydrocarbon carboxylic acyl group of less than 12 carbon atoms, R¹ is a lower alkyl group and Y is selected from the group consisting of a double bond between C–1 and C–2 and a saturated linkage between C–1 and C–2.

10. 6α-fluoro-17α-lower alkenyl-Δ⁴-androsten-17β-ol-3-one.

11. A compound of the following formula:

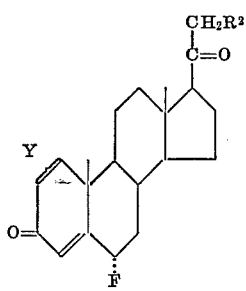

wherein R² is fluorine and Y is selected from the group consisting of a double bond between C–1 and C–2 and a saturated linkage between C–1 and C–2.

12. 6α,21-difluoro-Δ⁴-pregnen-3,20-dione.

13. 6α,21-difluoro-Δ¹,⁴-pregnadien-3,20-dione.

14. A compound of the following formula:

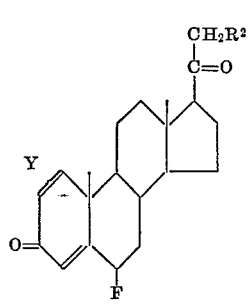

wherein R² is fluorine and Y is selected from the group consisting of a double bond between C–1 and C–2 and a saturated linkage between C–1 and C–2.

15. A compound of the following formula:

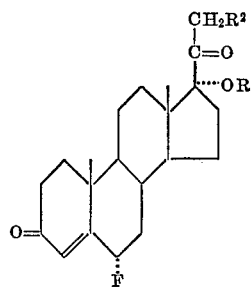

wherein R is selected from the group consisting of hydrogen and a hydrocarbon carboxylic acyl group of less than 12 carbon atoms, and R² is selected from the group consisting of hydrogen and fluorine and when R² is hydrogen, R is other than hydrogen.

16. The hydrocarbon carboxylic acid esters of less than 12 carbon atoms of 6α-fluoro-Δ⁴-pregnen-17α-ol-3,20-dione.

17. 6α,21-difluoro-Δ⁴-pregnen-17a-ol-3,20-dione.

18. The hydrocarbon carboxylic acid esters of less than 12 carbon atoms of 6α,21-difluoro-Δ⁴-pregnen-17α-ol-3,20-dione.

19. A compound of the following formula:

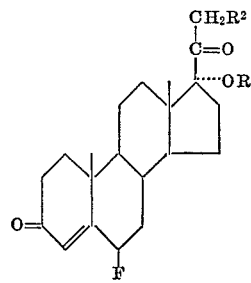

wherein R is selected from the group consisting of hydrogen and a hydrocarbon carboxylic acyl group of less than 12 carbon atoms, and R² is selected from the group consisting of hydrogen and fluorine, and when R² is hydrogen, R is other than hydrogen.

20. A compound of the following formula:

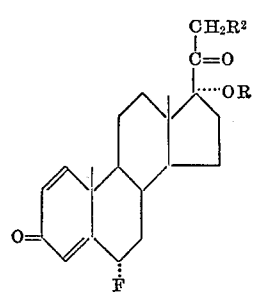

wherein R is selected from the group consisting of hydrogen and a hydrocarbon carboxylic acyl group of less than 12 carbon atoms, and R² is fluorine.

21. 6α,21-difluoro-Δ¹,⁴-pregnadien-17α-ol-3,20-dione.

22. The hydrocarbon carboxylic acid esters of less than 12 carbon atoms of 6α,21-difluoro-Δ¹,⁴-pregnadien-17α-ol-3,20-dione.

23. A compound of the following formula:

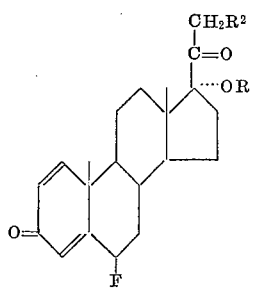

wherein R is selected from the group consisting of hydrogen and a hydrocarbon carboxylic acyl group of less than 12 carbon atoms, and $R^2$ is fluorine.

24. A compound of the following formula:

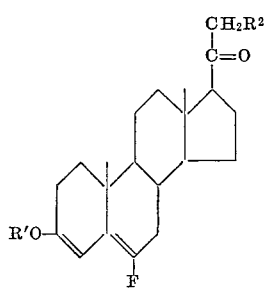

wherein $R^1$ represents lower alkyl and $R^2$ is selected from the group consisting of hydrogen and fluorine.

25. 6-fluoro-3-lower alkoxy-$\Delta^{3,5}$-pregnadien-20-one.

26. 6,21 - difluoro-3-lower alkoxy-$\Delta^{3,5}$-pregnadien-20-one.

27. A compound of the following formula:

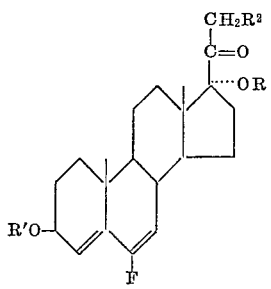

wherein $R^1$ represents lower alkyl, $R^2$ is selected from the group consisting of hydrogen and fluorine and R is selected from the group consisting of hydrogen and a hydrocarbon carboxylic acyl group of less than 12 carbon atoms.

28. A process for the production of 6-fluoro steroids selected from the group consisting of compounds of the pregnane series and compounds of the androstane series comprising reacting a corresponding 5α,6α-oxido compound with boron trifluoride.

29. The process of claim 28 wherein the boron trifluoride is in the form of its etherate.

30. A process for the production of 6α-fluoro-$\Delta^4$-steroids selected from the group consisting of compounds of the pregnane series and compounds of the androstane series comprising reacting a corresponding 5α,6α-oxido compound with boron trifluoride to form the corresponding 5α-hydroxy-6β-fluoro-steroid and thereafter dehydrating and inverting said last mentioned steroid with a mineral acid.

31. 6-fluoro-17β-hydroxy-17α-alkynl-4-androsten-3-ones of the following formula:

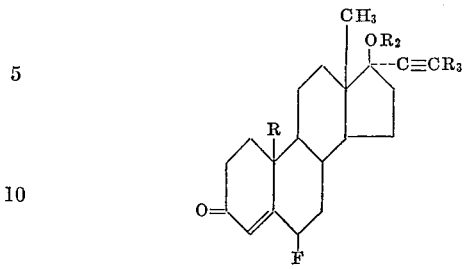

wherein R is selected from the group consisting of methyl and hydrogen, $R_2$ is selected from the group consisting of hydrogen and the acyl radical of a hydrocarbon carboxylic acid containing from one to twelve carbon atoms, inclusive, and $R_3$ is selected from the group consisting of hydrogen and an alkyl radical containing from one to four carbon atoms, inclusive.

32. 6 - fluoro - 17β-hydroxy-17α-ethinyl-4-androsten-3-one.

33. 6 - fluoro - 17β-hydroxy-17α-ethinyl-4-androsten-3-one 17-acylates in which the acyl radical is that of a hydrocarbon carboxylic acid containing from one to twelve carbon atoms, inclusive.

34. 6α - fluoro - 17β-hydroxy-17α-ethinyl-4-androsten-3-one.

35. 6β - fluoro - 17β-hydroxy-17α-ethinyl-4-androsten-3-one.

36. 6α - fluoro-17β-hydroxy-17α-ethinyl-4-androsten-3-one 17-acetate.

37. 3 - oxygenated - 6 - fluoro-5,17β-dihydroxy-17α-alkinyl androstanes of the following formula:

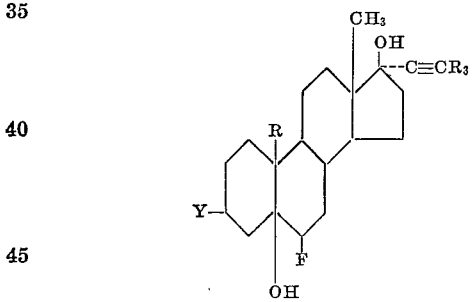

wherein R is selected from the group consisting of methyl and hydrogen, $R_3$ is selected from the group consisting of hydrogen and an alkyl radical containing from one to four carbon atoms, inclusive, and Y is selected from the group consisting of hydroxy and keto.

38. 6β - fluoro-3β,5α,17β-trihydroxy-17α-ethinylandrostane.

39. 6β - fluoro-5α,17β-dihydroxy-17α-ethinylandrostan-3-one.

40. 3β,17β - dihydroxy - 17α-alkinyl-15,6-epoxyandrostanes of the formula:

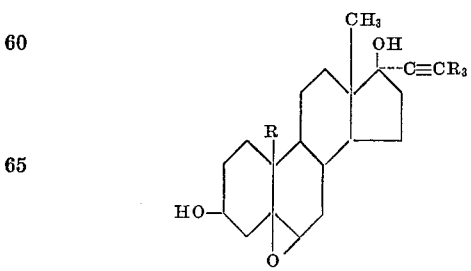

wherein R is selected from the group consisting of methyl and hydrogen, and $R_3$ is selected from the group consisting of hydrogen and an alkyl radical containing from one to four carbon atoms, inclusive.

41. 3β,17β - dihydroxy-17α-ethinyl-5α,6α-epoxyandrostane.

42. A process for the production of 6α-fluoroprogesterone which comprises: reacting 6β-fluoroprogesterone with a strong mineral acid to obtain 6α-fluoroprogesterone.

43. A process for the production of 6α-fluoroprogesterone which comprises: reacting 6β-fluoroprogesterone with hydrochloric acid to obtain 6α-fluoroprogesterone.

44. 6-fluoro-17α-hydroxyprogesterone.

45. 6β-fluoro-17α-hydroxyprogesterone.

46. 6α-fluoro-17α-hydroxyprogesterone.

47. 6-fluoro - 17α - hydroxyprogesterone 17 - acylate, wherein the acyl group is of a hydrocarbon carboxylic acid containing from one to twelve carbon atoms, inclusive.

48. Lower fatty acid esters of 6-fluoro-17α-hydroxyprogesterone.

49. 6α-fluoro-17α-hydroxyprogesterone 17-acetate.

50. 6β-fluoro-17α-hydroxyprogesterone 17-acetate.

51. 5,6 - oxido - 17α - hydroxypregnane - 3,20 - dione 17-acylate, 3-alkylene ketal wherein the acyl group is of a hydrocarbon carboxylic acid containing from one to twelve carbon atoms and wherein the alkylene radical contains not more than eight carbon atoms, inclusive, and the attaching oxygen to carbon bonds are separated by a chain of at least two and not more than three carbon atoms.

52. 5α,6α-oxido - 17 - hydroxypregnane - 3,20 - dione 17-acetate 3-ethylene ketal.

53. 5α,17α - dihydroxy - 6β - fluoropregnane - 3,20-dione 17-acylate, 3-alkylene ketal wherein the acyl group is of a hydrocarbon carboxylic acid containing from one to twelve carbon atoms and wherein the alkylene redical contains not more than eight carbon atoms, inclusive, and the attaching oxygen to carbon bonds are separated by a chain of at least two and not more than three carbon atoms.

54. 5α,17α - dihydroxy - 6β - fluoropregnane - 3,20-dione 17-acetate, 3-ethylene ketal.

55. 5α,17α - dihydroxy - 6β - fluoropregnane - 3,20-dione 17-acylate wherein the acyl group is of a hydrocarbon carboxylic acid containing from one to twelve carbon atoms, inclusive.

56. 5α,17α - dihydroxy - 6β - fluoropregnane - 3, 20-dione 17-acetate.

57. A process for the production of 6-fluoro-17α-hydroxyprogesterone 17-acylate which comprises: dehydrating a 5α, 17α-dihydroxy - 6β - fluoropregnane-3,20-dione 17-acylate with a compound selected from strong acids and alkali metal hydroxides to obtain 6-fluoro-17α-hydroxyprogesterone 17-acylate.

58. A process for the production of 6α-fluoro-17α-hydroxyprogesterone 17-acetate which comprises: dehydrating 5α,17α-dihydroxy-6β-fluoropregnane - 3,20-dione 17-acetate with a strong mineral acid to obtain 6α-fluoro-17α-hydroxyprogesterone 17-acylate.

59. A process for the production of 6α-fluoro-17α-hydroxyprogesterone 17-acetate which comprises: dehydrating 5α,17α - dihydroxy - 6β - fluoropregnane - 3,20-dione 17-acetate with dilute alkali at a temperature between zero and forty degrees centigrade to obtain 6β-fluoro - 17α - hydroxyprogesterone 17 - acetate, and isomerizing the thus obtained 6β-fluoro-17α-hydroxyprogesterone 17-acetate with a strong mineral acid to obtain 6α-fluoro-17α-hydroxyprogesterone 17-acetate.

60. 6-fluoro-17β-hydroxy-4-androsten-3-one.

61. 6α-fluoro-17β-hydroxy-4-androsten-3-one.

62. 6β-fluoro-17β-hydroxy-4-androsten-3-one.

63. 6β - fluoro - 3β,5α,17α - trihydroxypregnan - 20-one 17-acylate, wherein the acyl group is of a hydrocarbon carboxylic acid containing from one to twelve carbon atoms, inclusive.

64. 6β-fluoro - 3β,5α,17α - trihydroxypregnan - 20 - one 17-acetate.

65. 6β-fluoro - 3β,5α,17α - trihydroxypregnan - 20-one 3,17-diacylate, wherein the acyl radical is of a hydrocarbon carboxylic acid containing from one to twelve carbon atoms, inclusive.

66. 6β - fluoro - 3β,5α,17α - trihydroxypregnan - 20-one 3,17-diacetate.

67. 5,6 - oxido - 3β,17α - dihydroxypregnan - 20 - one 3,17 - diacylate, wherein the acyl group is of a hydrocarbon carboxylic acid containing from one to twelve carbon atoms, inclusive.

68. 5α,6α - oxido - 3β,17α - dihydroxypregnan - 20-one 3,17-diacylate, wherein the acyl group is of a hydrocarbon carboxylic acid containing from one to twelve carbon atoms, inclusive.

69. 5β,6β - oxido - 3β,17α - dihydroxypregnan - 20-one 3,17-diacylate, wherein the acyl group is of a hydrocarbon carboxylic acid containing from one to twelve carbon atoms, inclusive.

70. 5α,6α - oxido - 3β,17α - dihydroxypregnan - 20-one 3,17-diacetate.

71. 5β,6β - oxido-3β,17α - dihydroxypregnan - 20-one 3,17-diacetate.

72. 5,6 - oxido - 3β,17α - dihydroxypregnan - 20 - one 17-acylate, wherein the acyl group is of a hydrocarbon carboxylic acid containing from one to twelve carbon atoms, inclusive.

73. 5α,6α - oxido - 3β,17α - dihydroxypregnan - 20-one 17-acylate, wherein the acyl group is of a hydrocarbon carboxylic acid containing from one to twelve carbon atoms, inclusive.

74. 5β,6β - oxido - 3β,17α - dihydroxypregnan - 20-one 17-acylate, wherein the acyl group is of a hydrocarbon carboxylic acid containing from one to twelve carbon atoms, inclusive.

75. 5α,6α - oxido - 3β,17α - dihydroxypregnan - 20-one 17-acetate.

76. 5β,6β - oxido - 3β,17α - dihydroxypregnan - 20-one 17-acetate.

77. 6-fluoro-Δ⁴-androstene-3,17-dione.

78. 6α-fluoro-Δ⁴-androstene-3,17-dione.

79. 6β-fluoro-Δ⁴-androstene-3,17-dione.

References Cited

UNITED STATES PATENTS

| | | | |
|---|---|---|---|
| 2,838,490 | 6/1958 | Babcock et al. | 260—239.5 |
| 2,838,492 | 6/1958 | Pederson et al. | 260—239.5 |
| 2,838,496 | 6/1958 | Babcock et al. | 260—239.55 |
| 2,838,497 | 6/1958 | Spero et al. | 260—239.55 |
| 2,838,500 | 6/1958 | Campbell et al. | 260—239.55 |
| 2,838,528 | 6/1958 | Campbell et al. | 260—397.3 |
| 2,838,531 | 6/1958 | Babcock et al. | 260—397.4 |

OTHER REFERENCES

Junkman: Arch. Exper. Path. Pharmakol Bd (1954) pp. 244—253 relied on.

ELBERT L. ROBERTS, *Primary Examiner.*

U.S. Cl. X.R.

260—397.3, 397.4, 397.45, 397.47, 397.5

U.S. DEPARTMENT OF COMMERCE

PATENT OFFICE

Washington, D.C. 20231

UNITED STATES PATENT OFFICE
CERTIFICATE OF CORRECTION

Patent No. 3,438,978 April 15, 1

Howard J. Ringold et al.

It is certified that error appears in the above identified patent and that said Letters Patent are hereby corrected as shown below:

Column 26, cancel lines 20 to 23, 26, 27, 36 to 39, 42 and in their entireties comprising claims 69, 71, 74 and 76; line "70." should read -- 69. --; line 28, "72." should read -- 70. line 32, "73." should read -- 71. --; line 40, "75." should rea -- 72. --; line 44, "77." should read -- 73. --; line 45, "78." should read -- 74. --; line 46, "79." should read -- 75. --. I the heading to the printed specification, line 11, "79 Claims" should read -- 75 Claims --.

Signed and sealed this 12th day of August 1969.

(SEAL)
Attest:

Edward M. Fletcher, Jr.     WILLIAM E. SCHUYLER,
Attesting Officer                  Commissioner of Pat

U.S. DEPARTMENT OF COMMERCE

PATENT OFFICE

Washington, D.C. 20231

UNITED STATES PATENT OFFICE
CERTIFICATE OF CORRECTION

Patent No. 3,438,978                                                  April 15, 1969

Howard J. Ringold et al.

It is certified that error appears in the above identified patent and that said Letters Patent are hereby corrected as shown below:

Column 1, line 59, after "$\Delta^4$-" and before "17α" insert -- pregnen- --. Column 8, line 41, "$\Delta$" should be depicted as -- $\Delta^5$ --. Column 9, line 28, "dhehydroepiandrosterone" should read -- dehydroepiandrosterone --; line 64, "drynesn" should read -- dryness --; line 66, after "diol" insert -- -3-one --. Column 21, line 33 "alkenyl" should read -- alkinyl --. Column 25, line 32, "redical" should read -- radical --.

Signed and sealed this 17th day of February 1970.

(SEAL)
Attest:

Edward M. Fletcher, Jr.                                      WILLIAM E. SCHUYLER, JR.

Attesting Officer                                                   Commissioner of Patents